(12) United States Patent
Metsänen

(10) Patent No.: US 7,077,958 B2
(45) Date of Patent: Jul. 18, 2006

(54) SEWAGE TREATMENT PLANT

(75) Inventor: Timo Metsänen, Helsinki (FI)

(73) Assignee: EVAC International OY (FI)

( * ) Notice: Subject to any disclaimer, the term of this patent is extended or adjusted under 35 U.S.C. 154(b) by 47 days.

(21) Appl. No.: 10/497,677

(22) PCT Filed: Nov. 20, 2002

(86) PCT No.: PCT/FI02/00922

§ 371 (c)(1),
(2), (4) Date: Jun. 3, 2004

(87) PCT Pub. No.: WO03/048053

PCT Pub. Date: Jun. 12, 2003

(65) Prior Publication Data

US 2005/0103696 A1    May 19, 2005

(30) Foreign Application Priority Data

Dec. 3, 2001    (FI) ................................... 20012366

(51) Int. Cl.
*C02F 3/00*    (2006.01)

(52) U.S. Cl. ................... 210/532.2; 210/220; 210/205; 210/207

(58) Field of Classification Search ............ 210/532.2, 210/220, 205, 207
See application file for complete search history.

(56) References Cited

U.S. PATENT DOCUMENTS

| | | | |
|---|---|---|---|
| 3,487,937 A | 1/1970 | Koulovatos | |
| 3,770,624 A | 11/1973 | McKibben et al. | |
| 4,253,957 A | 3/1981 | Sullivan | |
| 4,391,703 A | 7/1983 | Crosby | |
| 5,254,246 A | 10/1993 | Rivelli et al. | |
| 6,200,472 B1 | 3/2001 | Donald et al. | |
| 6,228,258 B1 | 5/2001 | Donald et al. | |
| 2001/0019026 A1* | 9/2001 | Berg et al. | .................. 210/170 |
| 2004/0129622 A1* | 7/2004 | Pattee | ........................ 210/232 |

FOREIGN PATENT DOCUMENTS

| | | |
|---|---|---|
| EP | 0764611 | 3/1997 |
| EP | 1245538 | 10/2002 |

* cited by examiner

*Primary Examiner*—Chester T. Barry
(74) *Attorney, Agent, or Firm*—Dean W. Russell; Kristin M. Crall; Kilpatrick Stockton LLP

(57) ABSTRACT

The invention relates to a sewage treatment plant for treatment of waste fluid, said plant comprising at least one aeration chamber (2, 3), a settling chamber (4) and a disinfection chamber (5). In order to rationalize the layout and the structure of the sewage treatment plant (1), the at least one aeration chamber (2,3) and the settling chamber (4) are arranged in a structural unit comprising opposite end walls (101, 102), opposite side walls (103, 104), a bottom part (105) and a cover part (106). The disinfection chamber (5) is arranged separately outside one of said end walls (101, 102), side walls (103, 104), bottom part (105) or cover part (106) of the structural unit.

9 Claims, 3 Drawing Sheets

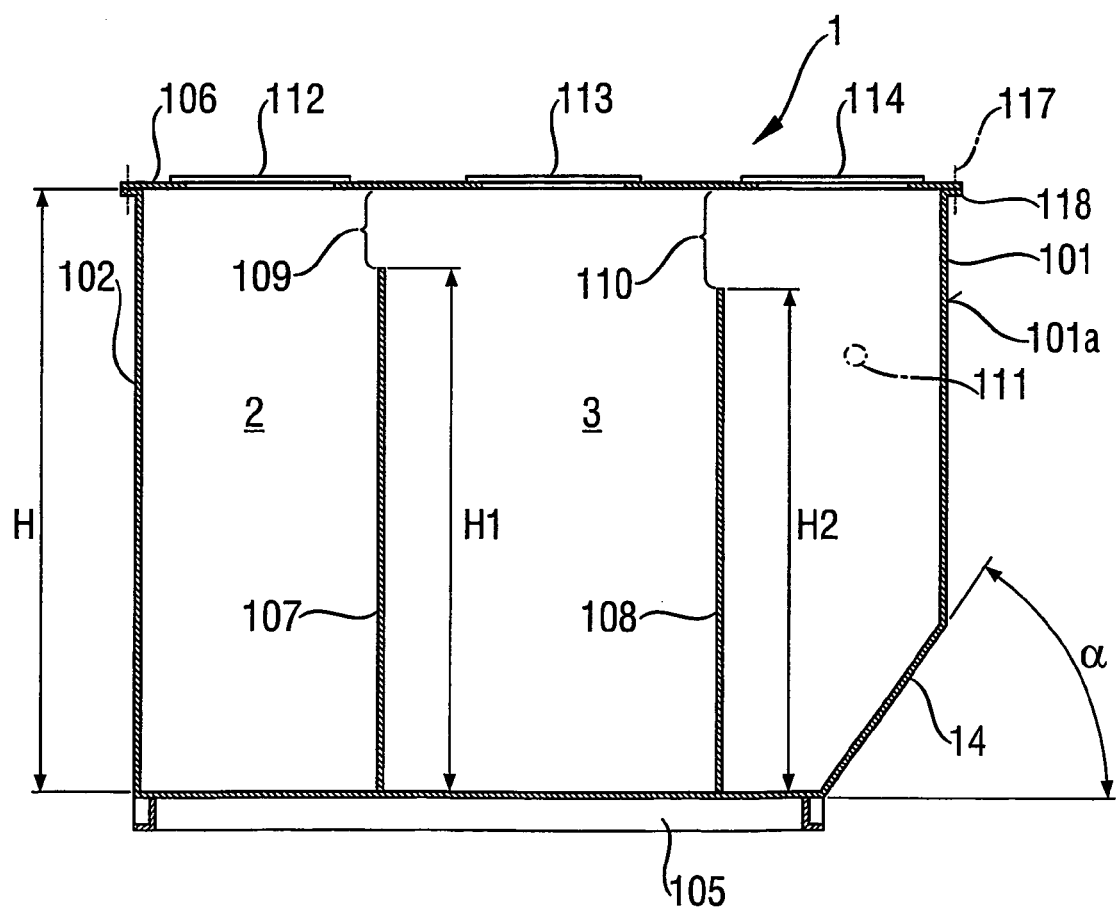

SEWAGE TREATMENT PLANT

CROSS REFERENCE TO RELATED APPLICATIONS

This application is the U.S. national phase of International Application No. PCT/FI02/00922 filed on Nov. 20, 2002 and published in English as International Publication No. WO 03/048053 A1 on Jun. 12, 2003, which application claims priority to Finnish Application No. 20012366 filed on Dec. 3, 2001.

The invention relates to a sewage treatment plant for treatment of waste fluid according to the preamble of claim 1.

Sewage treatment plants for treatment of waste fluid are well known in the art. In previously known sewage treatment plants waste fluid is firstly led to an aeration chamber by way of gravity or vacuum. The number of aeration chambers may vary, however, often one or two aeration chambers are sufficient to provide a desired aerobic treatment. From the aeration chamber the aerated waste fluid is forwarded to a settling chamber, where sludge is separated from the waste fluid, whereby clarified waste fluid is led to a disinfection chamber, where the treatment is finalised by chemical treatment.

The configuration and structure of known closed sewage treatment plants are most often very complex since the function of the various chambers set specific requirements also to the features of the individual chambers. Furthermore, the chambers usually are in fluid communication with each other through piping and thereto related pump means. The assembly and manufacturing of known treatment plants is thus very difficult. Secondly, the disinfection chamber is usually arranged in the same body as the other chambers, whereby the aerobic and chemical environments are mixed. The sewage treatment plant, due to the qualities of the sewage, also requires a high degree surface treatment of the internal surfaces subject to the sewage, which is made very difficult due to the complex structure and the mixed environments.

The object of the present invention is to provide a sewage treatment plant, by which the above disadvantages are avoided and which provides an efficiently and reliably operating device. This object is attained by a sewage treatment plant according to claim 1.

The basic idea of the invention is to rationalize the layout and structure of the treatment plant in View of the treatment process and its requirements. In the present invention the at least one aeration chamber and the settling chamber are arranged in a closed, substantially rectangular structural unit, or body, comprising opposite end walls, opposite side walls, a bottom part and a cover part, whereas the disinfection chamber is arranged outside one of said side walls, end walls, bottom part or cover part of the structural unit. In this way the aeration chamber(s) and the settling chamber, which are in the same size category, are arranged in one module operating in a common separated aerobic environment. The disinfection chamber, which usually is substantially smaller than the other chambers, is located outside the aerobic module, whereby it forms a separate chemical environment in a corresponding manner. This allows for minimizing the risk of chemical, usually chlorine, contamination of the aerobic environment. Furthermore, the surface treatment of the inside of the aerobic module and the chemical module can be arranged separately, as well as respective maintenance access.

By arranging the settling chamber at one end of the structural unit with an end wall portion forming one end wall of the structural unit and comprising at least a lower part which is inclined, the flow direction of the waste fluid is in sequence with the treatment steps. Secondly, the specific placing of the inclined wall portion facilitates assembly and surface treatment. Also, the inclined outer wall of the settling chamber, i.e. the body of the sewage treatment plant, may be placed near the side or the stern of a marine vessel, which usually have inclined configurations in these areas. This allows for efficient use of space aboard a marine vessel. Marine vessels are typical applications where closed sewage treatment plants are used.

The lower part of the end wall portion of the settling chamber is inclined and the angle of inclination of the end wall portion is advantageously about 45° to 70°, preferably about 55° to 65°. It has surprisingly shown that these inclination or slope values are sufficient in view of the settling stage, in which activated sludge is separated from the clarified waste fluid.

The disinfection chamber is advantageously arranged at the end wall portion of the settling chamber, forming an end wall of the structural unit, or a side wall portion of the settling chamber, forming a part of a side wall of the structural unit, whereby the aforementioned flow sequence can be followed.

The end wall portion or the respective side wall portion of the settling chamber, between the settling chamber and the disinfection chamber, is provided with an aperture for overflow of waste fluid. In this way the risks arising from mixing the aerobic environment and the chemical environment may be minimized.

The width of the disinfection chamber is advantageously smaller than the depth of the settling chamber, i.e. the end wall portion of the settling chamber, or the width of the settling chamber, i.e. the respective side wall portion of the settling chamber, and the height of the disinfection chamber is limited to an area above the inclined lower part of the end wall portion of the settling chamber. Further, the disinfection chamber is advantageously provided with a releasable cover portion, which facilitates assembly and maintenance.

A further advantageous feature of the sewage treatment plant according to the invention is that the cover part is releasably fastened to the structural unit, preferably with bolt or screw means. This further facilitates manufacture and assembly, including surface treatment of the inside of the unit, as well as maintenance, since the separate chambers can easily be accessed.

The sewage treatment plant is advantageously divided into partitions by at least one partition wall in order to form the at least one aeration chamber and the settling chamber. An opening is provided between the partition wall or walls and the cover part of the structural unit for overflow of waste fluid. This facilitates manufacture and assembly, and as the aerobic and chemical environments are separated, any possibly back-flow or splashing remains within the aerobic environment. This is especially advantageous e.g. on a marine vessel (discussed above) which is subject to rolling at sea. With this arrangement it is also sufficient with one common ventilation means for the aerobic environment.

The above discussed chamber arrangement is advantageous since it allows for forwarding the waste fluid from chamber to chamber by natural overflow instead of using piping and pump means as in the prior art solutions.

By arranging any necessary reinforcement structures outside the body of the sewage treatment plant, i.e. the structural unit, the inner surfaces of the chambers can be kept as plane as possible, which facilitates manufacture, assembly and maintenance.

The so-called closed sewage treatment plant according to the present invention is designed for treating so-called black water (waste fluid from toilets, urinals, hospital facilities) and so-called gray water (waste fluid from galleys, showers, wash basins, sinks), and is particularly advantageous for marine applications, i.e. marine vessels, in connection with which strict requirements relating to sewage and the discharge of the same prevail.

In the following the invention will be described more in detail, by way of example only, with reference to the accompanying schematic drawings, in which:

FIG. 3 shows a sectional view of the sewage treatment plant.

Figure 1:
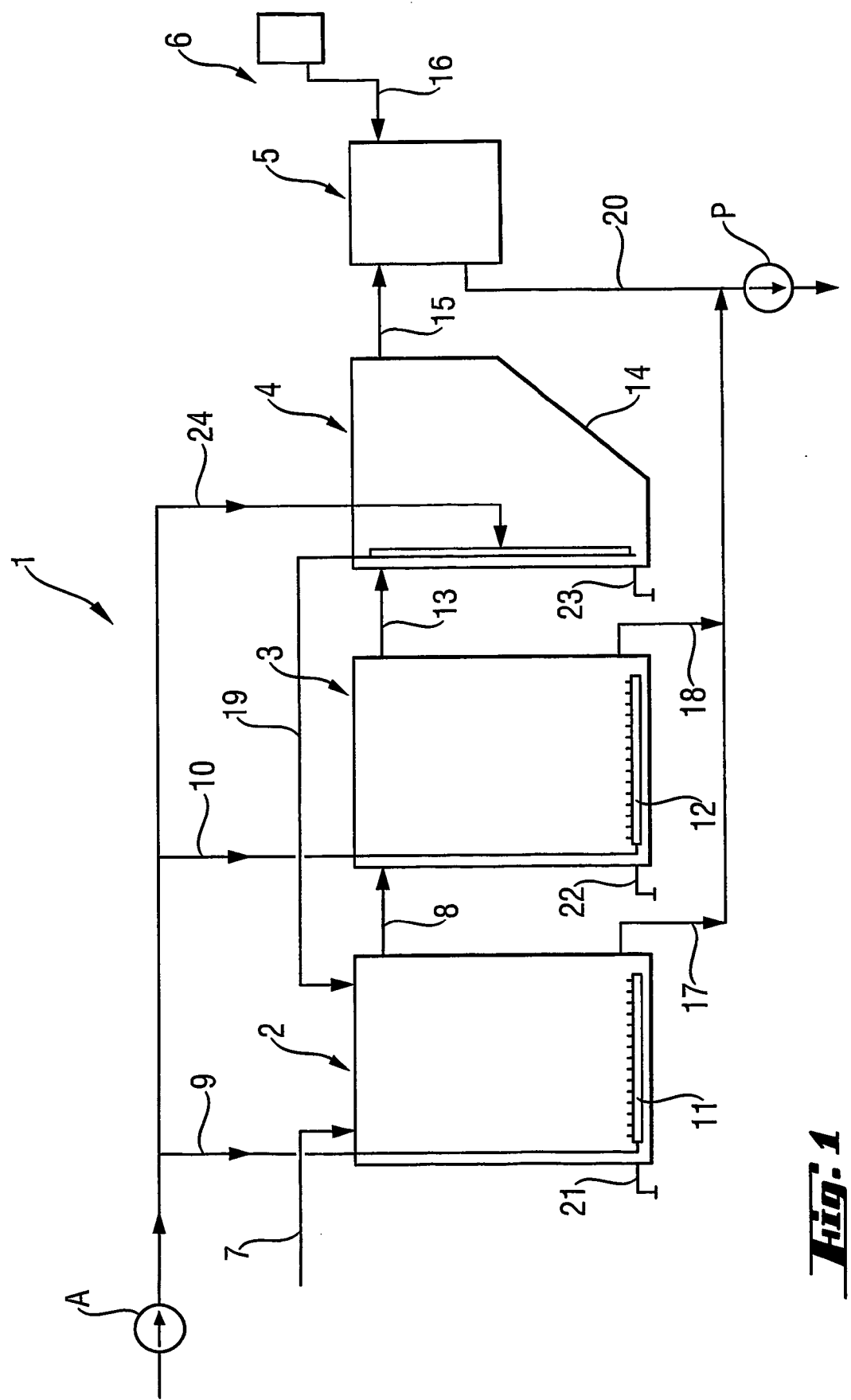
FIG. 1 shows a flow diagram principle for the sewage treatment plant.

The flow diagram shown in FIG. 1 is only intended to describe the treatment process of the sewage treatment plant according to the present invention in a general manner. The sewage treatment plant is indicated by reference numeral 1. The sewage treatment plant 1 comprises four chambers, i.e. a first aeration chamber 2, a second aeration chamber 3, a settling chamber 4 and a disinfection chamber 5 provided with a disinfectant dosage system 6.

Figure 2:
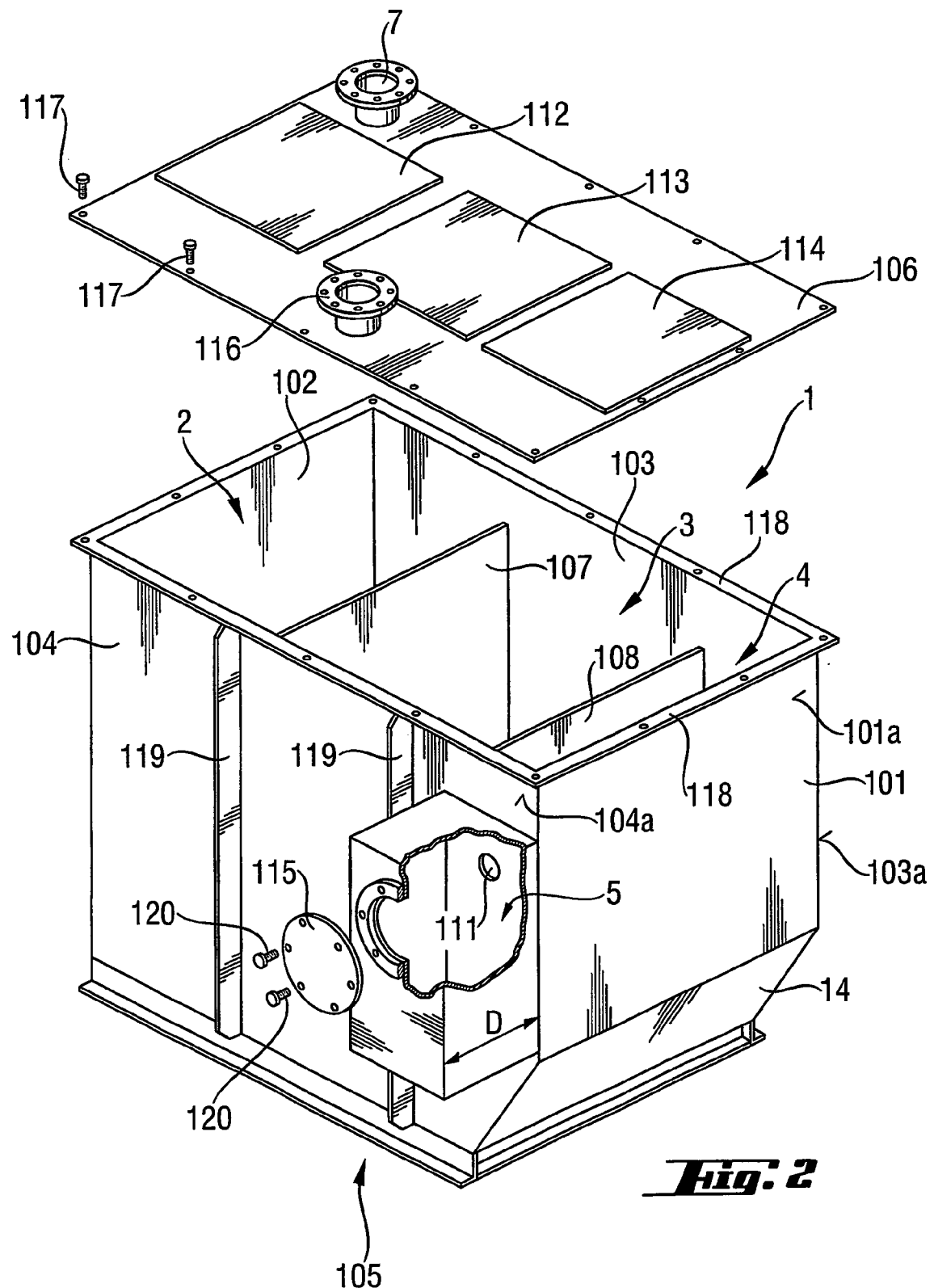
FIG. 2 shows a perspective view of the sewage treatment plant.

Waste fluid is supplied to the first aeration chamber 2 through line 7, indicated as an inlet port 7 in connection with FIG. 2, by way of gravity or vacuum. From the first aeration chamber 2 treated waste fluid is led to the second aeration chamber 3 by way of overflow indicated by line 8. In order to stimulate bacterial growth air is supplied to the first and second aeration chambers 2 and 3 by means of e.g. a blower A or fan through lines 9 and 10, which lead to air distribution means 11 and 12 arranged in the bottom area of the first and second aeration chambers 2 and 3.

From the second aeration chamber 3 the aerobically treated waste fluid is led to the settling chamber 4 by way of overflow indicated by line 13. When the treated waste fluid arrives in the settling chamber 4, activated sludge is separated by gravity by settling on the inclined end wall portion 14 of the settling chamber 4. Remaining activated sludge may be returned from the settling chamber 4 to the first aeration chamber 2 for renewed treatment through the return line 19. By connecting the air line 24 to the return line 19, the feedback of sludge can be arranged to be carried out by way of an ejector effect.

The first aeration chamber 2, the second aeration chamber 3 and the settling chamber 4 may advantageously be provided with a common air ventilation means 116 (FIG. 2) since these chambers are arranged in the same closed aerobic environment, as will also be discussed below in connection with FIGS. 2 and 3.

The sewage treatment plant may provide a sufficient treatment result with only one aeration chamber. The advantage with two aeration chambers is, however, that the aeration process can be carried out in two phases, a rougher phase and a subsequent finer phase, generally improving the result. Secondly, if one of the aeration chambers needs maintenance, the sewage treatment plant may still function adequately with only the other aeration chamber. Also, if one of the aeration chambers has to be completely drained, the bacterial strain is not completely destroyed as it remains in the other chamber. This is an important aspect since regeneration of bacterial strain may take a number of weeks.

The waste fluid is subjected to almost complete aerobic-biological degradation during its flow through the first three chambers. Thus, the clarified fluid in the settling chamber 4 may finally be led to the disinfection chamber 5 by way of overflow as indicated by line 15. The disinfection chamber 5 is supplied with disinfectant from a dosage system generally indicated by reference numeral 6 and line 16. A commonly used disinfectant is e.g. a chlorine based disinfecting chemical. The clarified and disinfected waste fluid may then be discharged from the disinfection chamber by discharge means, e.g. a pump means P, indicated on line 20.

Disinfection may also be supplemented by UV radiation, whereby the UV radiation system can be arranged in connection with the disinfection chamber or the above mentioned discharge means.

The purpose of disinfection is to eradicate bacteria.

Mineralized sludge may also be removed from the first and second aeration chambers 2 and 3 as indicated by lines 17 and 18. The first aeration chamber 2, the second aeration chamber 3 and the settling chamber 4 are advantageously also provided with separate drain means 21, 22 and 23.

FIGS. 2 and 3 show the sewage treatment plant 1, or more particularly the body of the same, from a more constructional viewpoint. The sewage treatment plant 1 comprises the first and second aeration chambers 2 and 3 and the settling chamber 4 arranged after each other in the structural unit or body of the sewage treatment plant, the chambers thus being arranged one after the other in the flow order or sequence of the waste fluid.

The structural unit comprises opposite end walls 101 and 102, opposite side walls 103 and 104, a bottom part 105 and a cover part 106 forming a closed entity having a substantially rectangular configuration. The first aeration chamber 2, the second aeration chamber 3 and the settling chamber 4 are formed within this substantially rectangular body by a first partition wall 107 and a second partition wall 108.

The disinfection chamber 5 is, in FIG. 2, shown to be arranged on the outside of the one side wall 104 of the structural unit, at a side wall portion 104a of the settling chamber 4. The disinfection chamber 5 could be arranged outside any one of said side walls 103, 104, end walls 101, 102, bottom part 105 or cover part 106 as desired. In view of the flow sequence, particularly the overflow process, one of the side wall portions 103a, 104a or the end wall portion 101a of the settling chamber 4 is be preferable.

In the following the disinfection chamber 5 will be discussed as arranged on one side wall portion 104a. However, it is clear that corresponding arrangements may be applied even with other positionings, whereby adequate flow arrangements, including piping when necessary, have to be provided.

The positioning of the disinfection chamber may be chosen according to the application or location of the sewage treatment plant, as well as according to availability of space.

The end wall portion 101a of the settling chamber 4, which also forms one of the end walls 101 of the structural unit, has an inclined lower part 14 for the settling process in this chamber. The angle $\alpha$ of inclination, i.e. between the plane of the bottom part 105 and the plane of inclined lower part 14, is advantageously about 45° to 70°, preferably about 55° to 65°. The angle $\alpha$ of inclination is to some degree dependent on the dimensions of the settling chamber 4. There are clear constructional and space requirement advantages in having only one inclined surface, opposed to a theoretically ideal, with regard to the settling process, funnel form, which shall be discussed more in detail below.

Waste fluid is supplied to the first aeration chamber 2 through the inlet port 7, indicated as line 7 in FIG. 1, for a first aeration phase. The overflow of waste fluid from the first aeration chamber 2 to the second aeration chamber 3, and further to the settling chamber 4, may advantageously be attained by providing a first opening 109 and a second opening 110 between the first partition wall 107 and the cover part 106 and the second partition wall 108 and the cover part 106. In practice this may e.g. be realized by giving the first partition wall 107 a height H1 less than the inner height H of the structural unit and the second partition wall 108 a height H2 less than the height H1 of the first partition wall 107, whereby a so-called natural overflow is achieved. The relative heights discussed above have to be dimensioned so that an appropriate degree of overflow is established. These chambers thus form a common and open aerobic environment within the structural unit separate from the chemical environment formed by the disinfection chamber 5.

Overflow from the settling chamber 4 to the disinfection chamber is arranged by providing an aperture 111 in the side wall portion 104a of the settling chamber 4, which aperture 111 opens directly into the disinfection chamber 5.

One or more of the chambers may be provided with high and low level monitoring means according to need, e.g. for securing the overflow function and to provide for a reliable treatment process.

The cover part 106 of the structural unit may be provided with only one common ventilation means 116 for the first and second aeration chambers 2 and 3 and the settling chamber 4 since these form a common and closed aerobic environment.

The disinfection chamber 5, which forms a chemical environment, is only in contact with the aerobic environment through the overflow aperture 111, which thus minimizes the risks of contamination of the aerobic environment by the chemical environment. The disinfection chamber 5 is usually also of a relatively smaller size than the other chambers, as is schematically indicated in FIG. 2. It is usually sufficient that the width of the disinfection chamber 5 is smaller than the width of the settling chamber 4, or the side wall portion 104a of the settling chamber 4, whereby the height of the disinfection chamber 5, due to constructional reasons may be limited to an area above the inclined lower part 14 of the end wall portion 104 of the settling chamber 4. The volume of the disinfection chamber 4 may then be varied by the depth D of the disinfection chamber.

The disinfection chamber is provided with a cover portion 115, which may be arranged to be fastened to the side wall of the disinfection chamber 5 with bolt or screw means 120. An additional advantage with the separation of the disinfection chamber 5 from the rest of the chambers is that sedimentation, which usually accumulates during the disinfection stage and has a negative effect on the cleaning process, easily can be removed.

The cover part 106 may further be provided with a first cover portion 112, a second cover portion 113 and a third cover portion 114 for accessing the first aeration chamber 2, the second aeration chamber 3 and the settling chamber 4 respectively, e.g. for provisional maintenance of or sample testing from the individual chambers. The cover portion 106 is advantageously fastened to the structural unit by bolt or screw means 117, advantageously by having a peripheral flange portion 118 arranged around the upper edges of the end walls 101 and 102 and the side walls 103 and 104 of the structural unit.

The structural unit is can easily be reinforced by arranging reinforcement structures, such as ribs 119, on the outer sides of the end and side walls 101, 102, 103 and 104, as well as the bottom part 105 and the cover part 106 of the structural unit. Corresponding measures may also be taken with the disinfection chamber 5 when necessary. The reinforcement structures 119 are shown on only one side wall 104 of the structural unit, by way of example only. However, it is to be understood that they can be applied on any outside surfaces, if and when found necessary.

The constructional advantages of the sewage treatment plant according to the invention are, in addition to what has been indicated above, as follows. First of all, the end walls 101 and 102, the side walls 103 and 104, the bottom part 105 and the cover part 106, which also constitute the respective portions, e.g. 101a, 103a and 104a, of the individual chambers, including the inclined lower part 14 of the end wall portion 101a of the settling chamber 4, may be manufactured from metal plates or sheets, which can be welded together. Access to the inside welding spots is facilitated by the releasably fastenable cover part 106 of the structural unit as well as the only one inclined wall portion 14 of the settling chamber 4. This also facilitates adequate inside surface treatment of these components, having clearly exposed surfaces, which is extremely important with regard to the substances treated in the sewage treatment plant and their corrosive effect.

This also concerns the disinfection chamber 5 in a corresponding manner.

The plain design also facilitates installation of additional components, such as pipes, pipe mountings, grids, etc.

The above description and the drawings relating thereto are only intended for clarifying the basic idea of the invention. The invention may vary in detail within the scope of the ensuing claims.

The invention claimed is:

1. Sewage treatment plant for treatment of waste fluid, said plant comprising at least one aeration chamber, a settling chamber, and a disinfection chamber, wherein the at least one aeration chamber and the settling chamber are arranged one after the other in the flow order of the waste fluid in a structural unit, which comprises opposite end walls, opposite side walls, a bottom part, at least one partition wall in order to form the at least one aeration chamber and the settling chamber such that the chambers form a common aerobic environment, and a cover part releasably fastenable to the structural unit in order to form the common aerobic environment and arranged to provide access to the at least one aeration chamber and the settling chamber when the cover part is removed; and wherein the disinfection chamber is arranged outside the structural unit, on an end wall portion of the settling chamber or on a side wall portion of the settling chamber; and the disinfection chamber is provided with a releasably fastenable cover portion.

2. Sewage treatment plant according to claim 1 wherein the end wall portion of the settling chamber, which forms an end wall of the structural unit, comprises at least a lower pan which is inclined.

3. Sewage treatment plant according to claim 2 wherein the lower part of the end wall portion of the settling chamber is inclined and the angle ($\alpha$) of inclination is about 45° to 70°, preferably about 55° to 65°.

4. Sewage treatment unit according to claim 1 wherein the end wall portion or the respective side wall portion of the settling chamber, between the settling chamber and the disinfection chamber, is provided with an aperture for overflow of waste fluid.

5. Sewage treatment plant according to claim 4 wherein the width of the disinfection chamber is smaller than the depth of the settling chamber, i.e., the end wall portion of the settling chamber, or the width of the settling chamber, i.e., a side wall portion of the settling chamber, and the height of the disinfection chamber is limited to an area above the inclined lower part of the end wall portion of the settling chamber.

6. Sewage treatment plant according to claim 1 wherein the cover part of the structural unit is releasably fastenable to the structural unit with bolt or screw means.

7. Sewage treatment plant according to claim 1 wherein the cover position of the disinfection chamber is releasably fastenable to the disinfection chamber by bolt or screw means.

8. Sewage treatment unit according to claim 1 wherein an opening is provided between the upper edge of the partition wall or walls and the cover part of the structural unit for overflow of waste fluid.

9. Sewage treatment plant according to claim 1 wherein the structural unit is provided with one or more reinforcement structures and reinforcement structures are arranged on the outside of said walls and parts.

* * * * *